US011166000B1

(12) United States Patent
Ross et al.

(10) Patent No.: US 11,166,000 B1
(45) Date of Patent: Nov. 2, 2021

(54) CREATING A VIDEO FOR AN AUDIO FILE

(71) Applicant: Google LLC, Mountain View, CA (US)

(72) Inventors: David Ross, San Jose, CA (US);
Hrishikesh Aradhye, Santa Clara, CA (US); Douglas Eck, Palo Alto, CA (US); Christopher Tim Althoff, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/180,449

(22) Filed: Nov. 5, 2018

Related U.S. Application Data

(63) Continuation of application No. 13/786,395, filed on Mar. 5, 2013, now Pat. No. 10,122,983.

(51) Int. Cl.
| | | |
|---|---|---|
| H04N 9/802 | (2006.01) | |
| G11B 27/031 | (2006.01) | |
| G11B 27/022 | (2006.01) | |
| G11B 27/00 | (2006.01) | |
| G06F 16/60 | (2019.01) | |
| G06F 16/68 | (2019.01) | |
| G06F 16/683 | (2019.01) | |

(52) U.S. Cl.
CPC ............. *H04N 9/802* (2013.01); *G06F 16/60* (2019.01); *G06F 16/68* (2019.01); *G06F 16/683* (2019.01); *G06F 16/686* (2019.01); *G11B 27/00* (2013.01); *G11B 27/022* (2013.01); *G11B 27/031* (2013.01)

(58) Field of Classification Search
None
See application file for complete search history.

(56) References Cited

U.S. PATENT DOCUMENTS

| | | |
|---|---|---|
| 7,853,344 B2 | 12/2010 | Khan et al. |
| 9,646,585 B2 | 5/2017 | Ikeda et al. |
| 2004/0260682 A1 | 12/2004 | Herley et al. |
| 2005/0044561 A1 | 2/2005 | McDonald |
| 2005/0066352 A1 | 3/2005 | Herley |
| 2005/0091062 A1 | 4/2005 | Burges et al. |
| 2008/0066099 A1* | 3/2008 | Brodersen .......... H04N 7/17318 725/35 |
| 2009/0177299 A1 | 7/2009 | Van De Sluis et al. |
| 2009/0307207 A1 | 12/2009 | Murray |
| 2010/0250585 A1 | 9/2010 | Hagg et al. |
| 2011/0090249 A1 | 4/2011 | Sheba et al. |

(Continued)

OTHER PUBLICATIONS

Chen, C. et al., "Emotion-based Music Visualzation using Photos", 11 pages.

(Continued)

*Primary Examiner* — Gelek W Topgyal
(74) *Attorney, Agent, or Firm* — Lowenstein Sandler LLP

(57) ABSTRACT

A processor determines metadata associated with an audio track. The processor identifies categories that are related to the audio track based on the metadata. The processor determines rankings for the categories that are related to the audio track. The ranking is indicative of a relevance of a particular category to the audio track. The processor performs a query to identify visual media for one or more of ranked categories. The visual media is related to the audio track. The processor generates a visual presentation for the audio track by selecting at least some of the visual media to include in the visual presentation.

20 Claims, 10 Drawing Sheets

(56) References Cited

U.S. PATENT DOCUMENTS

| | | |
|---|---|---|
| 2011/0154197 A1 | 6/2011 | Hawthorne et al. |
| 2011/0276567 A1 | 11/2011 | Asikainen et al. |
| 2012/0259634 A1 | 10/2012 | Tsunokawa |
| 2013/0282747 A1 | 10/2013 | Cheng et al. |
| 2014/0082651 A1 | 3/2014 | Sharifi |
| 2014/0143212 A1 | 5/2014 | Shumay |

OTHER PUBLICATIONS

Shamma D., et al., "Music Story: a Personalized Music Video Creator" Intelligent Information Laboratory, Northwestern University, 4 pages.

Xu, S., et al., "Automatic Generation of Music Slide Show using Personal Photos" Tenth IEEE International Symposium on Mulitmedia, 2008, pp. 214-219.

Funasawa, S. et al., "Automated Music Slideshow Generation Using Web Images Based on Lyrics" 11th International Society for Music Information Retrieval Conference, 2010, pp. 63-68.

Dunker, P. et al., "Semantic High-Level Features for Automated Cross-Modle Slideshow Generation" Frauhofer Institute for Digital Media Technology Iimenau, Germany 6 pages.

Cai, R. et al., Automated Music Video Generation Using Web Image Resource: ICASSP 2007, pp. 11-737-11-7440.

Wang, Z., et al., "Retrieving Web Images to Enrich Music Representation" ICME 2007, pp. 256-259.

Dunker, P., et al., "Content-based Mood Classification for Photos and Music: A generic multi-modal classification framework and evaluation approach" MIR'08, Oct. 30-31, 2008, pp. 97-104, Vancouver, British Columbia, Canada.

\* cited by examiner

CREATING A VIDEO FOR AN AUDIO FILE

RELATED APPLICATIONS

This application is a continuation application of U.S. patent application Ser. No. 13/786,395, filed Mar. 5, 2013, the entire contents of which are hereby incorporated by reference herein.

TECHNICAL FIELD

This disclosure generally relates to automatic construction of a video for a given audio file based upon relevant data mining, collection, and/or selection.

BACKGROUND

Widespread growth of network-based content delivery has led to new ways of disseminating content, whether professionally created or otherwise. For example, an aspiring artist can record a song, upload the song to a content server, and users all over the world can download and listen to the song. Today, a very large majority of songs or other audio files do not have an associated video. Professional music videos are expensive and are typically produced only for the most popular songs of well-known or well-funded artists. In some cases users might create videos, but such is time-consuming, and often requires skill sets or tools that are beyond the reach of typical users.

In other cases, attempts have been made to automate the creation of videos by drawing from a collection of personal photos, by generating queries derived from lyrics associated with the song, or by selecting images based upon a mood. In these and other cases, the results have not been particularly compelling in consistently creating videos that have a professional character.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to creating a video for an audio composition in an automated fashion. A mapping component can be configured to map metadata associated with an audio track to entity data included in a data store. A ranking component can be configured to determine a relationship between the audio track and a data entry included in the entity data. The ranking component can determine a relevance rank for the relationship. A media mining component can be configured to determine a media query to a media repository based on the relevance rank. A compilation component can be configured to construct a video for the audio track from media collected in response to the media query.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
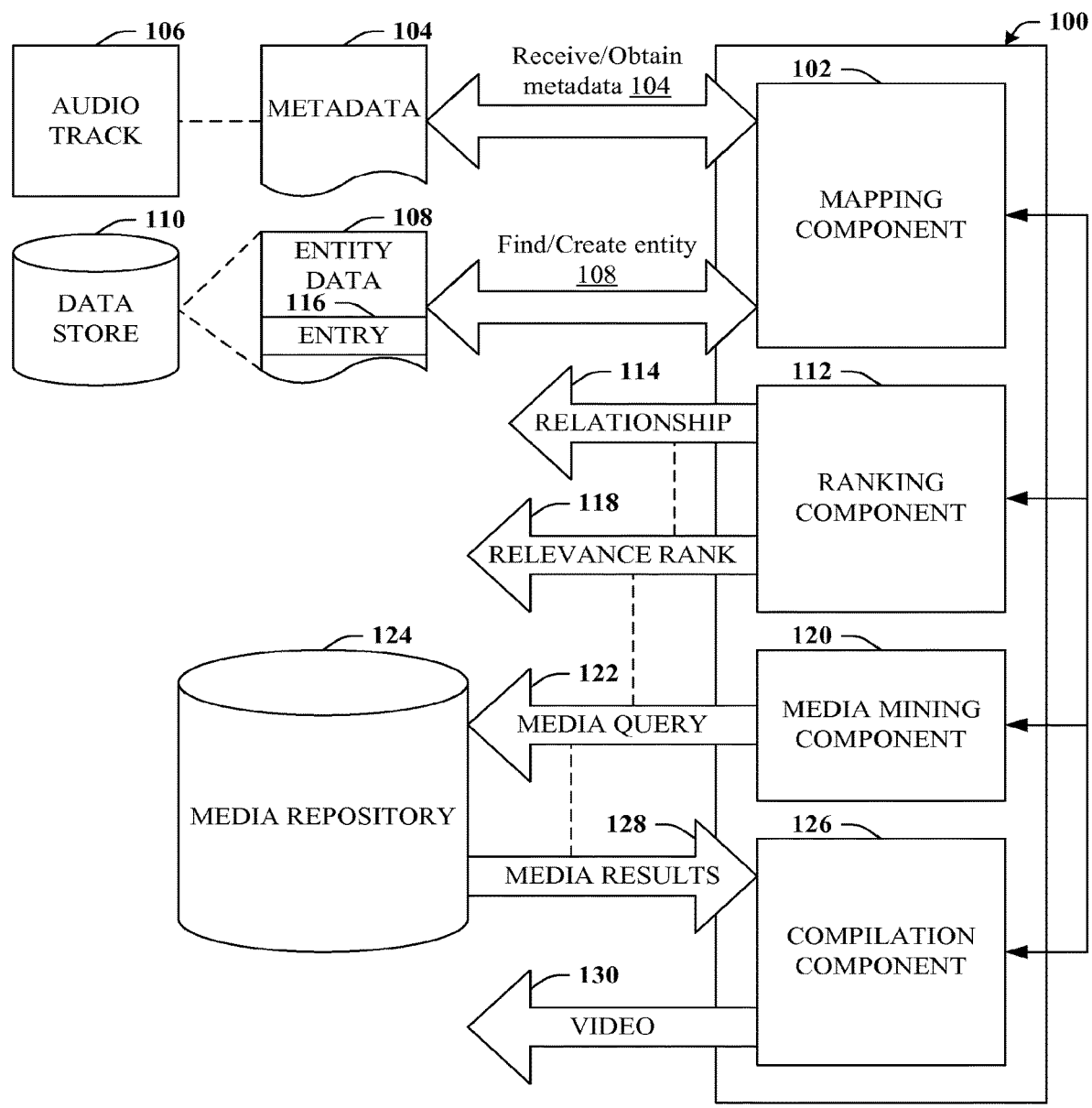
FIG. 1 illustrates a block diagram of an example system that can automatically create a video for an audio file in accordance with certain embodiments of this disclosure.

In the music industry it is common that a popular album by a popular artist or band might be released along with music videos. Typically, even though the album might include ten or more tracks, professional videos might be released for only a few of these tracks that are expected to be popular. For less popular songs there might be no video at all or only unprofessional user-generated videos that do not attract many viewers. On the other hand, having a compelling video for certain audio files (e.g., songs) can increase popularity for the audio file and improve the experience associated with a content consumer, which can be beneficial for the artist as well as advertisers, recording labels, and consumers.

Unfortunately, creating a compelling video is generally very expensive. Automation of the video creation process can significantly reduce costs; however, attempts to automate this process by conventional systems are not adequate for a wide variety of reasons. One of the most common reasons prior attempts to automate music video creation has failed is because prior automation schemes tend to select images that are not relevant in many cases such as personal photos of a user or images selected based upon mood or lyrics that are not contextually consistent, or the like.

Systems and methods disclosed herein relate to automatically generating a relevant and/or professional-grade video for an audio file. Such can be accomplished with a very small set of initial information, e.g., the artist name and the track name and/or track number, which is generally standard metadata information included in the audio file. From this initial metadata, rich information can be collected for one or more entities (e.g., an artist, the related song, an instrument, etc.) associated with the audio file. Such information can be stored for later access and/or utilized on the fly. Over time, entities can grow with additional data resulting in a data profile or portfolio for each of the entities, which can be stored in a structured manner.

Relationships can also be determined between various entities as well as between various data entries included in particular entity data. These relationships can be ranked in terms of relevance. The most relevant relationships and/or the most relevant data entries can be employed to determine queries to a media repository, which can include both images and videos. Results to these queries can be filtered and re-ranked, with the most relevant results comprising the set of media from which the video is to be constructed.

Music analysis and audio processing can be used to develop a semantic structure associated with a presentation of the audio file. For example, beat tracking and tempo estimation can be used to align transitions between images and videos to the beat of the music. A chorus or other repeating structures can be identified as well. As another example, instrument recognition techniques or solo recognition techniques can be identified and such can have an impact on the video creation. For instance, an image or video of a drummer for the band can be selected and presented during a drum solo included in the audio file.

Assembling content into the video can also be based on fixed sequencing rules or templates. For instance, content related to the main artist can be presented first, followed by album art, band members, musical origin, birthplaces of band members, and ending with related artists. If the track was used as part of a movie soundtrack, a movie template can be used that shows movie shots, director, composer, actors, and so forth. Furthermore, the rules or templates can be based on heuristics that are learned. For example, videos that are popular or provide another desired feature can be examined to learn effective construction templates. Machine-learning can also be employed for ranking and ordering content, which can be general; or specific to an artist, a genre, etc.

Given entities can include substantial textual information, such information can be used to annotate the video by providing informative captions, which can be rendered with the video or provided as a dynamic overlay. Captioning can also be rules based, and in the case of dynamic overlays can have multiple layers any of which can be turned on or off by the content consumer. Video generation can be dynamic and change over time as new data sets are discovered or input by users and can also be affected by characteristics associated with the content consumer. Captioning can be provided based on the language associated with the content consumer. As another example, an artist might be popular in one country for different reasons than in another country, and these differences can be identified and employed for ranking content. Thus, a video created for a given audio file for a content consumer in Japan might differ from a video created for the audio file for a content consumer in Germany. Additional aspects or features are detailed herein.

Example Video Creation

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Referring now to FIG. 1, a system 100 is depicted. System 100 can, inter alia, automatically create a video for an audio file. Embodiments disclosed herein, for example, can provide video creation that is relevant and compelling, potentially on par with professional human-created videos. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include a mapping component 102, a ranking component 112, a media mining component 120, and a compilation component 126.

Mapping component 102 can be configured to map metadata 104 associated with an audio track 106 to an entity data 108. Entity data 108 can exist in data store 110 and represent a portfolio or profile. For example, entity data 108 can represent audio track 106 in general (e.g., a profile/portfolio associated with a song), an artist or artists who recorded audio track 106, an instrument used in the production of audio track 106, or the like. Examples of metadata 104 are provided in connection with FIG. 2A, which can be referenced now in tandem with FIG. 1.

Figure 2A:
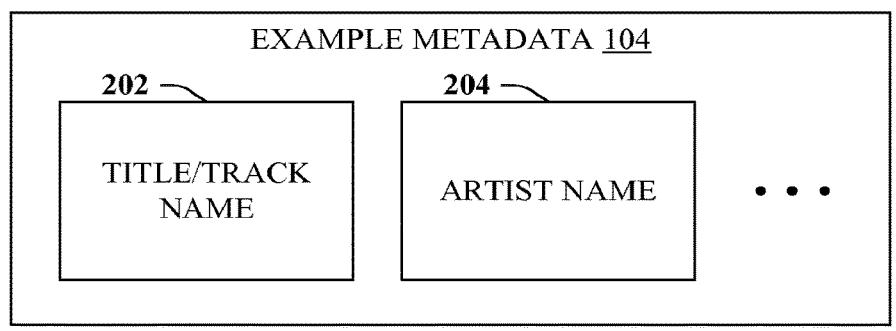
FIG. 2A illustrates a block representation of examples of metadata associated with the audio file in accordance with certain embodiments of this disclosure.

Illustration 200 of FIG. 2A provides examples of metadata 104, which is generally standardized and can be encoded in audio file 106. Such can include track name 202 and artist name 204, which can include a composer name or similar information. Additional metadata might exist such as, e.g., album name. However, whether standardized or unstructured, other such metadata might not be useful or relevant as certain embodiments of this disclosure utilize only metadata associated with track name 202 (or track number and album from which track name 202 can be determined) and artist name 204.

Continuing the description of FIG. 1, as described, mapping component 102 can map metadata 104 to entity data 108. If no relevant entry 108 exists in data store 110, mapping component 102 can facilitate creation of entity data 108. It is understood that mapping component 102 can map (or create) multiple entities 108 in connection with audio track 106 and/or metadata 104. To illustrate, mapping component 102 can identify or create a first entity data 108 relating to a band who performed or created audio track 106, a second entity data 108 relating to a particular artist included in the band, a third entity data 108 relating specifically to the audio track 106 (e.g., a song by the band) or the album in which audio track 106 appears, a fourth entity data can relate to genre that defines the audio track 106 or an associated band, and a fifth entity data can relate to an instrument played in the performance of audio track 106. Other example entities can exist as well.

Figure 2B:
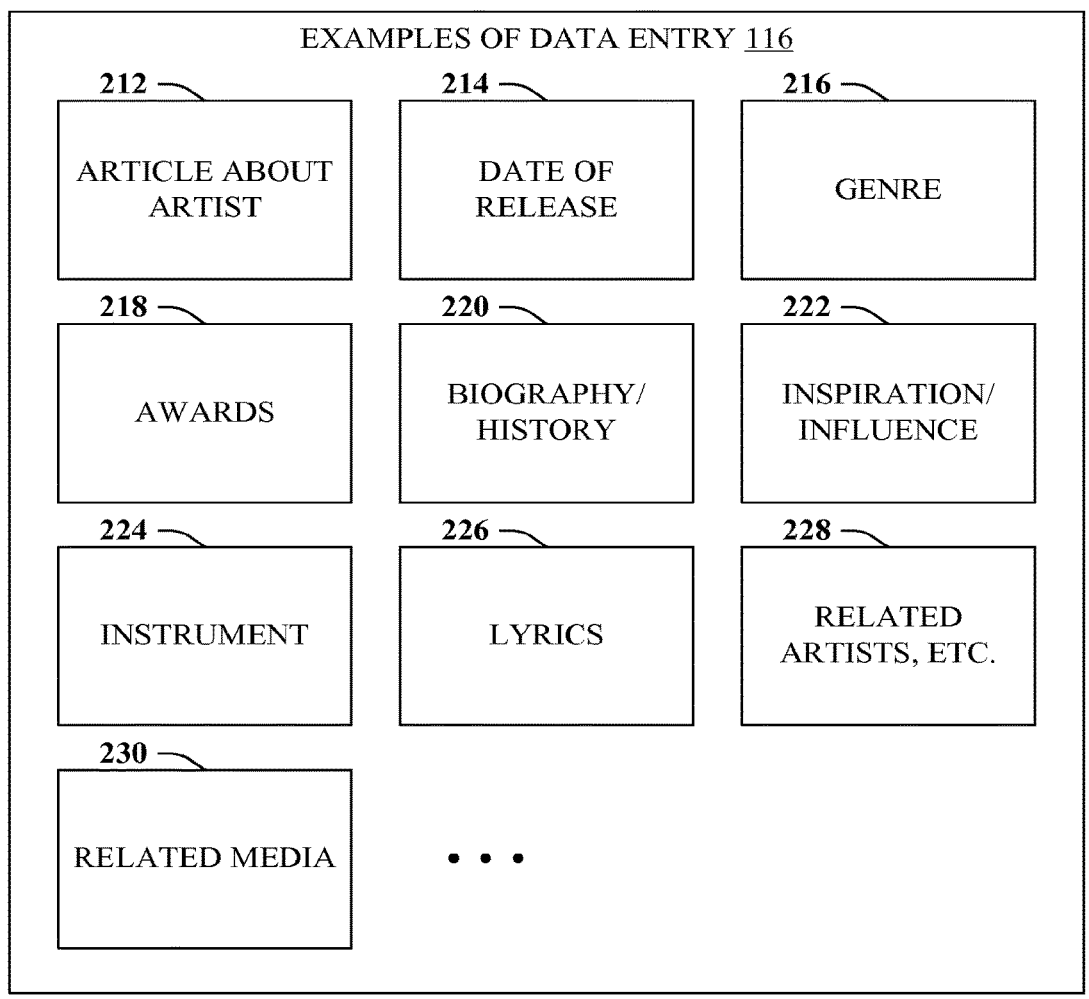
FIG. 2B illustrates a block representation of examples of data entries associated with the audio file in accordance with certain embodiments of this disclosure.

Ranking component 112 can be configured to determine relationship 114 between audio track 106 and data entry 116 included in entity data 108. Entity data 108 can include many data entries 116 that relate to entity data 108, examples of which are provided with reference to FIG. 2B. Turning now to FIG. 2B, illustration 210 lists numerous non-limiting examples of data entry 116 that can be included in a given entity data 108. For example, data entry 116 can include articles about an artist or band, which is depicted by reference numeral 212. If entity data 108 relates to the entire band, then articles 212 can relate to any of the band members, however, if entity data 108 relates to a specific band member, then articles 212 might only include articles focused on that band member and exclude articles focused on other band members.

Data entry 116 can also include data associated with a date of release 214 of audio track 106 or an album including audio track; a genre 216 for audio track 106, the album, or the artist/band; or an award 218 associated with the audio track 106, the album, or the artist/band. Such can relate to awards received as well as those for which the entity was nominated. Data entry 116 can include data associated with biography/history 220. For example, such data can relate to musical origin of the artist/band (e.g., where their musical career began, formal training, etc.) as well as birthplaces and birthdates for an artist. Inspiration/influence 222 can relate to data associated with an inspiration for a song or other entity as well as other artists that influenced the entity (e.g., artist/band) or were influenced by the entity. Data entry 116 can also include data associated with instrument 224 used in the production of audio file 106; lyrics 226 associated with audio file 106; and related artists (or bands, or songs, or instruments, etc.) 228; and related media 230 such as, e.g., references to information relating to entity 108 or other media in which audio file 106 is included (e.g., a movie for which audio file is a portion of a related soundtrack).

Still referring to FIG. 1, in addition to determining relationship 114, detailed above, ranking component 112 can be configured to determine relevance rank 118 for relationship 114. For a given entity data 108, relevance rank 118 can apply to a particular data entry 116 and can relate to the relevance of that data entry 116 with respect to audio file 106. Additionally or alternatively, relevance rank 118 can apply to a related entity data 108 or a data entry 116 included in the related entity data with respect to the audio file 106.

Figure 4:
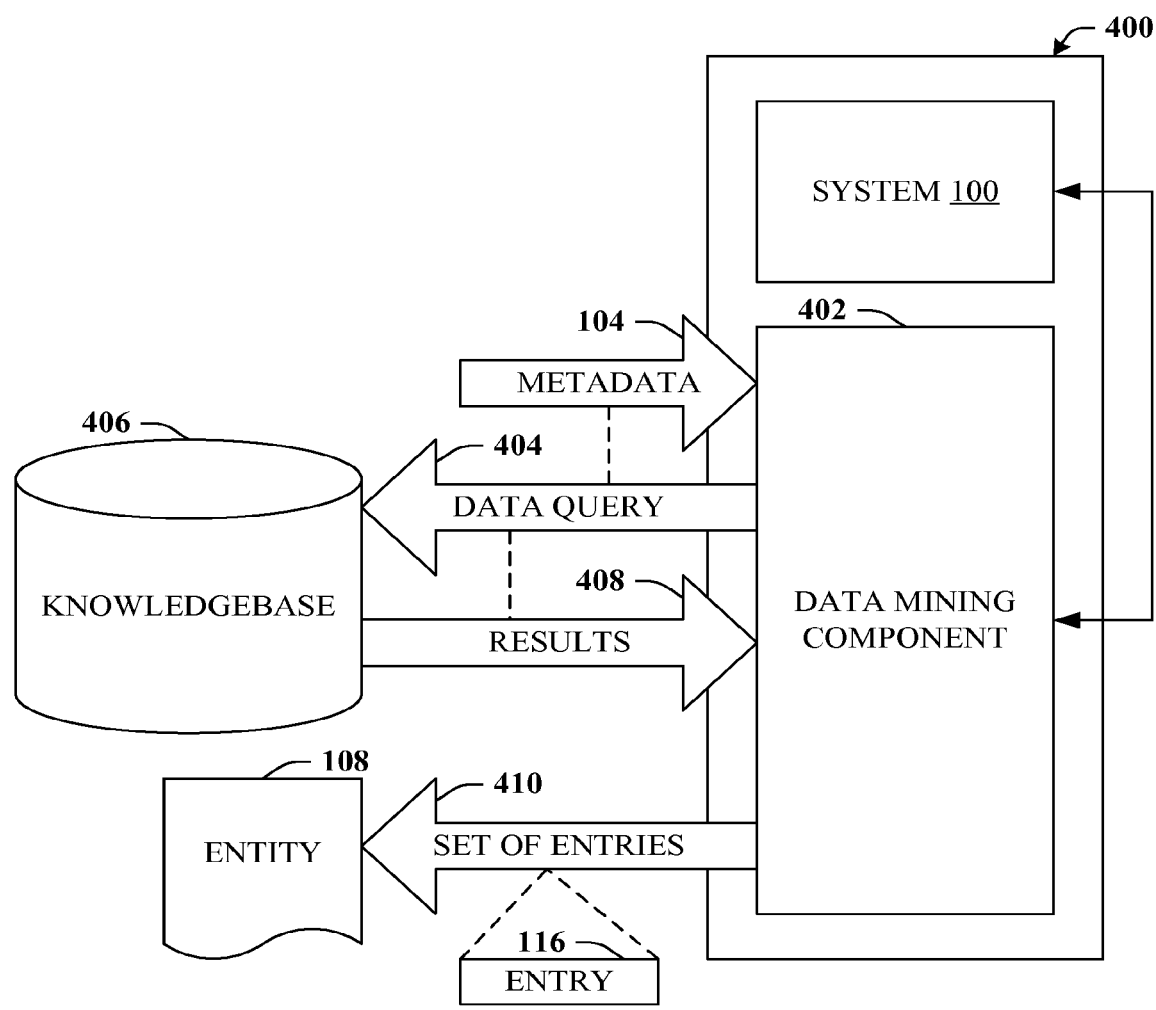
FIG. 4 illustrates a block diagram of an example system illustrating a data mining embodiment in accordance with certain embodiments of this disclosure.

Examples relating to data mining or collection and population of data entries 116 can be found in connection with FIG. 4, which can be included in some embodiments. In other embodiments, such data already exists in data store 110. In either case, it might not be known which facts or data entries 116 are important or relevant to a video for audio file 106. Ranking component 112 can facilitate determinations associated with which data entries 116 are most relevant with respect to audio file 106, which can be identified based on relevance rank 118. For example, a given entity data 108 associated with audio track 106 might be associated with two different genres, but relevance rank 118 can be utilized to identify the genre in this case that is most relevant. As another example, a lead guitarist might showcase a lute for audio track 106. Therefore, while a guitar might be most relevant for other audio tracks for which the lead guitarist is associated, the lute might be most relevant for audio track 106. As another example, if audio track 106 is part of a film soundtrack, then the most important actors or characters for the movie can be identified based on relevance rank 118.

Media mining component 120 can be configured to determine media query 122 based on relevance rank 118. For example, data entries 116 that are deemed to be most relevant, typically based on relevance rank 118, can be included in media query 122. Media query 122 can be provided to media repository 124, which can be an unstructured repository (e.g., a search engine image search), a semi-structured repository (e.g., user-based image or video hosting sites), or a structured repository with curated and/or professionally managed annotations. Media mining component 120 can include query expansion features that can be applied based on intent. For example, "album art" versus "live concert images" or the like. Media query 122 can also be constrained to specific categories depending on the search entity data 108 and intent. Such constraints can be specific categories such as "photo" from "image search" of "search engine X" or "editorial images" from "curated repository Y," or based on annotation defined by a taxonomy such as "Headshot" or "waist up" or "live concert" from "professionally annotated stock photography collections".

For less popular artists or songs or other entities associated with audio track 106 or when little data or related media content is available, additional means exist for populating data store 110 and/or media repository 124. For example, a music label, an artist, a fan, or other users can upload relevant media content or other information. Lyrics or genre associated with audio file 106 can be employed to identify relevant concepts for which more abundant media can be located. For example, media query 122 can include terms such as "cemetery" or "darkness" for tracks of the genre "Gothic". Such terms can be determined through analysis of term frequency and discrimination of the lyrics of known songs from that genre.

Additionally or alternatively, when little or no relevant media is identified for a portion of audio track 106, then professional stock photography (e.g., nature pictures or video scenes, etc.) can be selected. Such can be improved by training content-based image/video ranking models that review other videos from the same genre or other relevant characteristic.

Compilation component 126 can be configured to construct video 130 from media collected (e.g., media results 128) in response to media query 122. Video 130 can be a video associated with audio track 106 that is relevant and more compelling than simply presenting a view of the album cover while playing the audio file, which is the extent of many videos that exist today. Additional features or aspects associated with compilation component 126 can be found with reference to FIG. 3.

Figure 3:
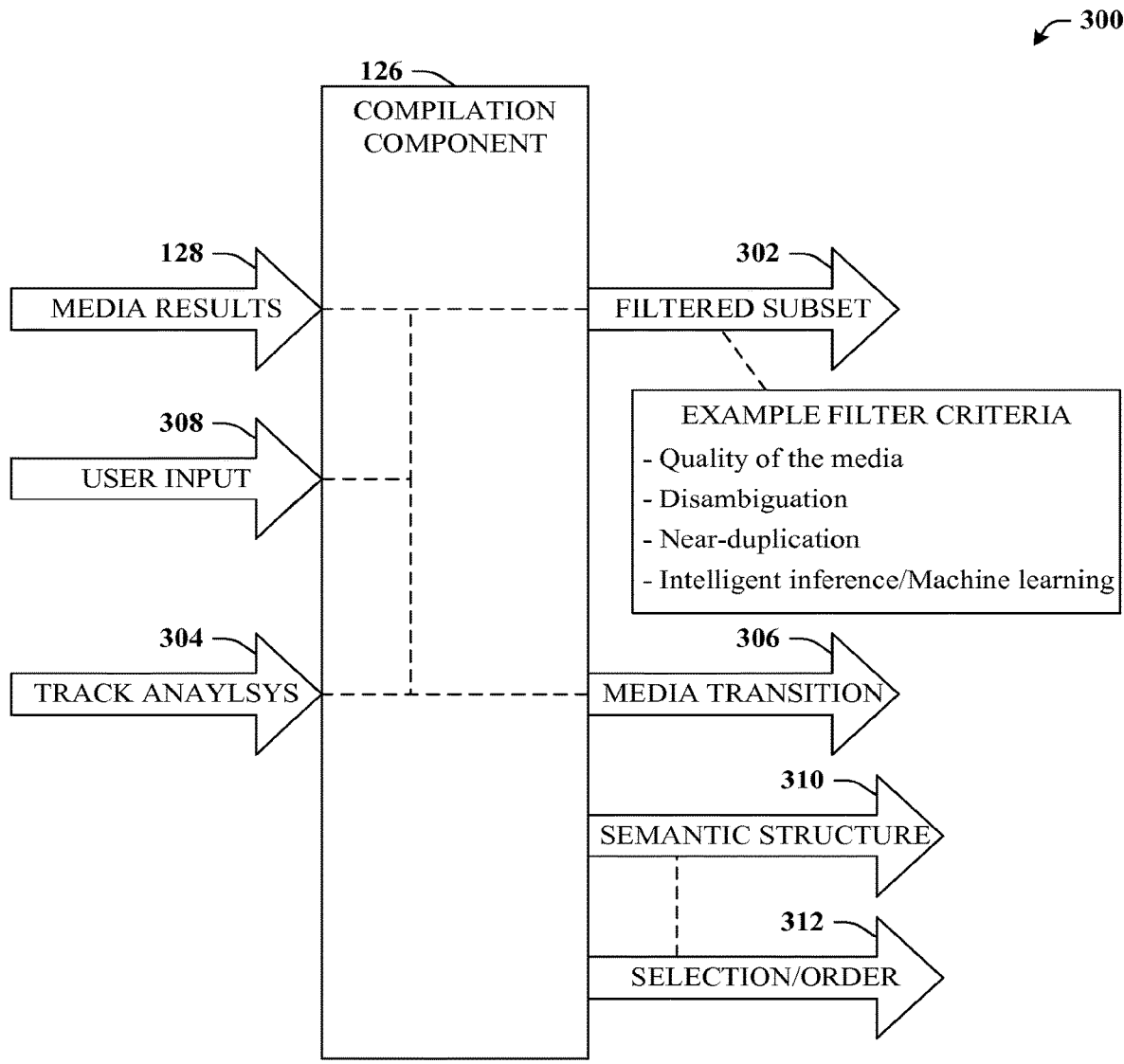
FIG. 3 illustrates a block diagram of an example system that depicts additional aspects or detail in connection with the compilation component in accordance with certain embodiments of this disclosure.

Turning now to FIG. 3, system 300 is depicted. System 300 can provide for additional features in connection with compilation component 126. For example, in some embodiments, compilation component 126 can be configured to filter the media collected in response to media query 126 and to construct video 130 for audio track 106 from a filtered subset 302 of the media. For example, media results 128 returned by media repository 124 in response to media query 126 can be filtered based upon numerous criteria.

In some embodiments, compilation component 126 can filter media based on a quality of the media. For example, an image that is of higher quality is less likely to be filtered than an otherwise similar image of lower quality. Quality can be based upon characteristics such as resolution, contrast, saturation, depth-of-field or the like and decisions relating to selection or filtering can be trained from, e.g., supervised/curator scores from managed photo collections.

Additionally or alternatively, compilation component 126 can filter media based on disambiguation techniques. Media results can include items that arise due to certain ambiguities, and such can be mitigated by various disambiguation techniques. For example, consider the case in which media query includes a request for the musician, Jack Johnson. In the case of results 128 from unstructured (or not sufficiently structured) repositories, such results might include a well-known boxer or a well-known hockey player, each different individuals, but sharing a common name, Jack Johnson. Such an ambiguity can even arise from structured sources that are not adequately managed or curated, but can be mitigated by, e.g., utilizing celebrity face recognition techniques to filter or select the desired individual (e.g., select media that includes the musician Jack Johnson, but filter media that includes the boxer or the hockey player, Jack Johnson).

In some embodiments, compilation component 126 can filter media based on near-duplicate prevention techniques. For example, to mitigate displaying the same or very similar media content more than once per video 130, duplicate media as well as near-duplicate (e.g., substantially similar media) can be filtered by compilation component 126 from media results 128.

Compilation component 126, potentially in connection with ranking component 112, can also re-rank media items included in filtered subset 302. Such re-ranking can be based on matching scores between content-based images and videos and audio track 106, metadata 104 (e.g., artist name, track name), and/or certain data entries 116 (e.g., genre, mood, conceptual or contextual features, etc.) as well as features associated with the content consumer (e.g., country, language, settings, etc.). Re-ranking can be based on a machine learning model and can be trained by any suitable technique, e.g., an embedding/ranking model that can be configured to enforce a visual consistency of the different media content that is selected and/or used in connection with video 130.

Media items included in filtered subset 302 can comprise the various media items used to construct video 130. However, in some embodiments, media content included in filtered subset 302 can be ordered into a meaningful sequence. This ordering is depicted by selection/order 312 and can be based on rules that can be fixed or heuristically learned. As one specific example, order 312 can be fixed to lead with content relating to the primary artist, then transition to album art, then to other band members, then to musical origins, then to birthplaces of band members, and end with related artists. Other examples can be readily envisioned, typically based on different ordering of media items, where the order can be derived from combinations or permutations of data entry 116 concepts and/or relevant entities 108.

Timing of the ordered sequences (e.g., order 312) of media items that comprise video 120 and/or transitions 306 from one media item to the next can be determined based upon track analysis 304, which can be performed by com-pilation component 126 or performed by a different component with results provided to compilation component 126. Track analysis results can relate to the length, tempo, and beat locations of audio track 106 or to more complicated musical structures like identification of instrumental solos. Such structures can be identified and referenced based upon a semantic structure 310 that can be determined based on track analysis 304. Timing or media transitions 306 can also depend on a quantity of available and relevant media content (e.g., filtered subset 302), a quantity of entity data 108 data, a length of audio track 106, as well as external factors such as characteristics of a particular content consumer or a target audience.

Rules relating to media transitions 306 or timing can be learned based on examination of human-generated music videos, particularly those that are widely popular or popular in a particular region. Additionally or alternatively, a multimedia concept detection system and a structured knowledge base can be used to infer what types of facts and relationships (e.g., data entries 116 and relationships 114) are relevant or compelling to content consumers or a particular subset of content consumers with respect to various portions of audio tracks. For example, it can be determined that visceral images are more popular at the beginning of a song and soothing videos are more popular at the end of a song, perhaps in connection with a particular genre or based upon the likes of a particular audience or content consumer. As another example, it can be learned that images of the artist(s) are presented first, that it is expected the album cover or other album art must be shown, though not necessarily in any particular order, and that videos of artists should be presented during the portions of audio track 106 in which their performance is being showcased (e.g., present media of the drummer during a drum solo, guitarist during a guitar solo, and the lead singer while actually singing). Rules can also be learned based on ranking models for specific artists, a specific genre, or a specific target audience (e.g., German content consumer versus an American content consumer) by examining existing and/or popular human-generated videos.

In some embodiments, the determination of filtered subset 302 or media transitions 306 can be based upon user input 308. For example, user input 308 can include a user, or in some cases an authorized user adding relevant content or removing content that has been selected for inclusion in video 130 by the automated portions. Such user input can also add or remove entities 108, data entries 116, and/or relationships 114. User input 308 can be particularly beneficial for new artists or those without much notoriety.

When construction video 130, compilation component 126 can also employ smart cropping techniques in connection with media transition 306. For example, it is unlikely that all media collected or included in filtered subset 302 is of the same aspect ratio of music video 130. Compilation component 126 can facilitate a crop of a given image or video to the desired aspect ratio and also rid the presentation of gray blocks or other artifacts. Typically, it is desirable to ensure that no important parts of the cropped media are removed, such as the artist's face or the artist in a wide scene. Compilation component 126 can facilitate salient region detection techniques to determine one or more regions of interest and crop the image or video accordingly.

Cropping can also be a function of numerous characteristics of factors. For example, depending on the area of the salient regions of interest, the area of the image or video, height and width of the desired aspect ratio versus the full image, the confidence score of the salient region detection processing, and so forth, various different transition effects or techniques can be employed. For instance, media transitions 306 can include zooming, horizontal pan, vertical pan, still shot features, or a combination or collage of images. A very popular effect, known as the Ken Burns Effect, which includes a combination of zooming and panning at the same time can also be employed. While this effect is known for professional, human-created media, this effect has not been successfully implemented without human selection of the various parameters. However, this effect can be effectively implemented in an automated fashion in connection with the disclosed subject matter by predicting suitable parameters based on results of the salient region detection.

Compilation component 126 can operate to construct both static and dynamic videos, both of which have advantages. Static videos are typically more attractive in terms of scalability and network caching. Dynamic videos have the advantage of being customizable and can change over time (as more data and media becomes available), which can increase diversity. In terms of customization, dynamic videos can be personalized to a particular content consumer or target audience. Further, relevant information such as links to buy a particular song or album, concert dates in the user's area can be included in movie 130 as opposed to conventional techniques that display ads as a dynamic overlay. Compilation component 126 can also achieve some of the advantages of dynamic videos with static videos by re-rendering the static video 130 periodically, e.g., once per week or the like.

Referring now to FIG. 4, system 400 is provided. System 400 illustrates a data mining embodiment. System 400 can include all or a portion of system 100 or other components detailed herein. As described, mapping component 102 (of system 100) can map metadata 104 to an existing entity data 108 included in a data store. System 400 can, in addition, populate the data store 110 with relevant data. For example, system 400 can include data mining component 402 that can be configured to determine data query 404. Data query 404 can be provided to knowledgebase 406, which can be a store of facts or knowledge such as, e.g., a library or catalog, a wiki, a recording label database, a newspaper archive, and so on. Data query 404 can be based on metadata 104 and therefore might request information relating to articles about a particular artist associated with audio track 106, a name and release date of the album containing audio track 106, or any other suitable elements, including examples provided in connection with data entries 116 of FIG. 2B. Results 408 in response to data query 404 can be returned to data mining component 402 from knowledgebase 406, and such results can be aggregated into a set of data entries 410 associated with audio track 106 (and including data entry 116), and stored to entity data 108 of data store 110.

In some cases, query 404 can be derived based upon results 408 of previous queries. For example, if a previous query turns up an article in which an artist associated with audio file 106 was heavily influenced by Led Zeppelin then a data entry 116 for the entity data 108 representing the artist can be included that indicated "heavily influenced by Led Zeppelin." Such can yield subsequent searches in connection with the related entity (Led Zeppelin) as well as a data entry for that related entity indicated its influence on artist.

Figure 5:
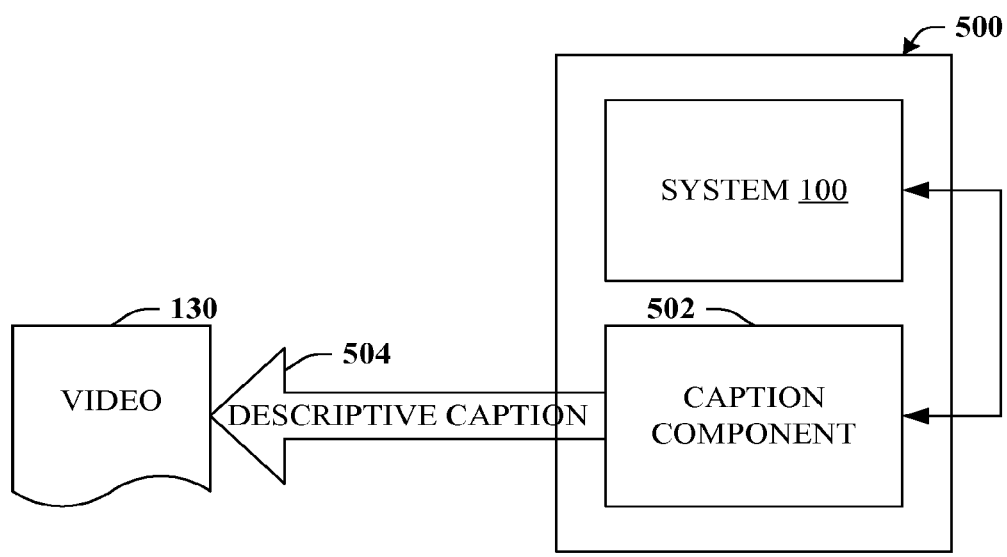
FIG. 5 illustrates a block diagram of an example system depicting a caption annotation embodiment in accordance with certain embodiments of this disclosure.

Turning now to FIG. 5, system 500 is depicted. System 500 depicts a caption annotation embodiment and can include all or a portion of system 100 as well as other components detailed herein. System 500 can include caption component 502 that can be configured to determine descriptive caption 504 associated with a portion of video 130.

Descriptive caption 504 can relate to an interesting or fun fact related to audio file 106 or associated entities 108, and can be presented as a caption, info box, info bubble over a relevant portion of video 130, which can be determined based on screen location or time. Such captions 504 can provide a story or narrative to the viewer during presentation of video, which can be both entertaining and informative.

Captions 504 can also be employed to explain why a particular media item is included in video 130. For example, an image or video included in video 130 might relate to a place where a performing artist's musical career began. If the content consumer is unaware of that context, the experience might be entirely different than if the content consumer is aware of such. By expressing this relationship, the content consumer is less likely to miss the relevance of an image and more likely to appreciate the viewing experience of video 130.

It is understood that captions 504 can be sourced from data included in a relevant entity data 108, typically a data entry 116 for that entity data 108. Such data can be collected by data mining component 402 or otherwise exist in data store 110. If displaying textual data employed for a caption (e.g., drawn from an article about the song or artist) is too long to be easily read in a few seconds, then sentence segmentation or other natural language processing techniques can be employed to divide the text into smaller snippets that can be displayed in sequence.

Descriptive caption 504 can be embedded in video 130 or presented as a dynamic overlay, similar to subtitles. Presenting captions 504 as a dynamic overlay has several advantageous such as the ability to display translated text for different languages, the ability to easily edit such text, and the ability to organize various different types of captions 504 into distinct layers that can be toggled on or off according to user preference. With dynamic overlays, text font or format can be changed on the fly to enable, for example, display of song lyrics that are timed and/or highlighted according to timing to provide a karaoke version.

Example Methods for Automatically Creating a Video for an Audio Track

Figure 6:
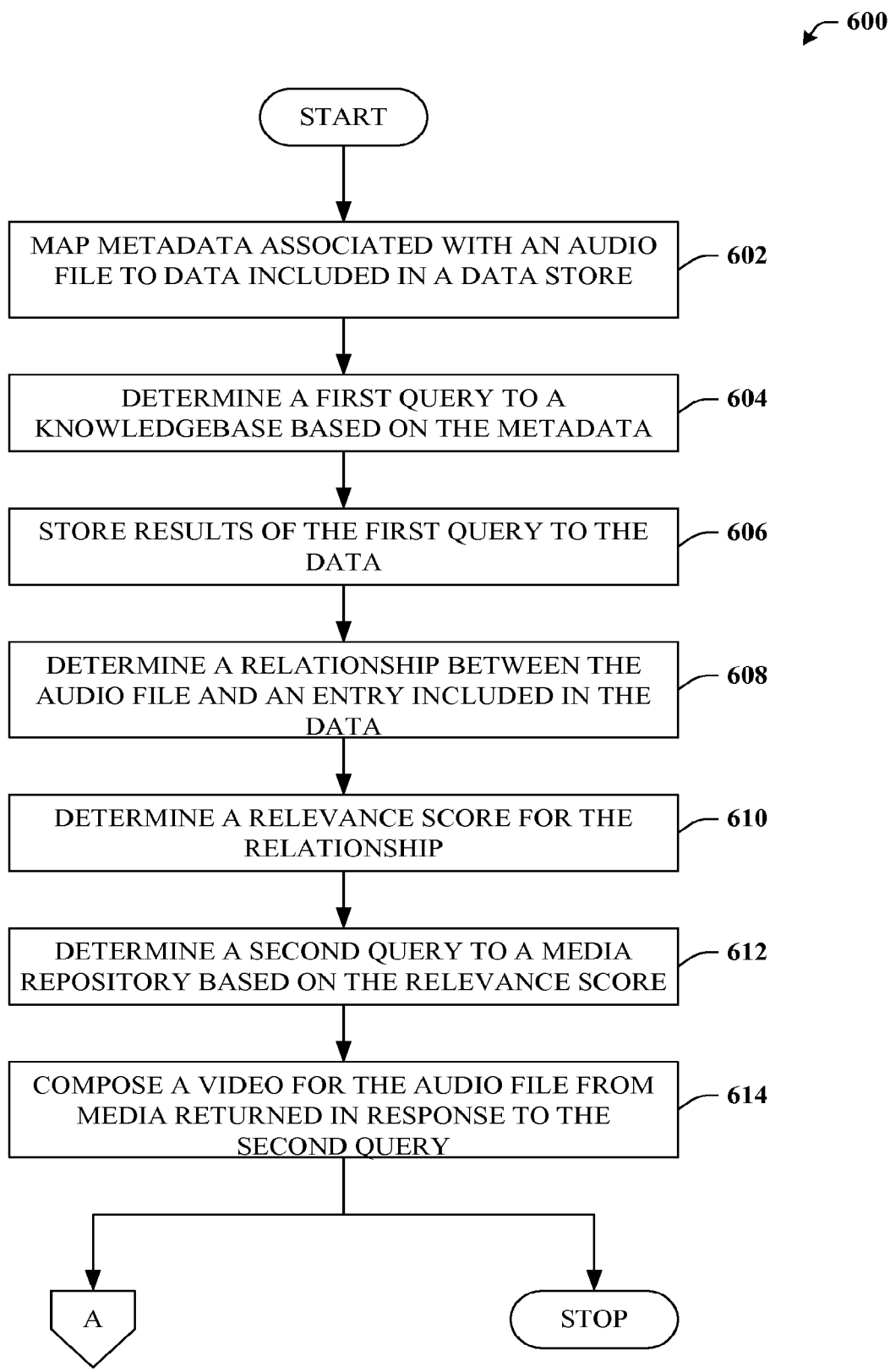
FIG. 6 illustrates an example methodology that can provide for automatically creating a video for an audio file in accordance with certain embodiments of this disclosure.
Figure 7:
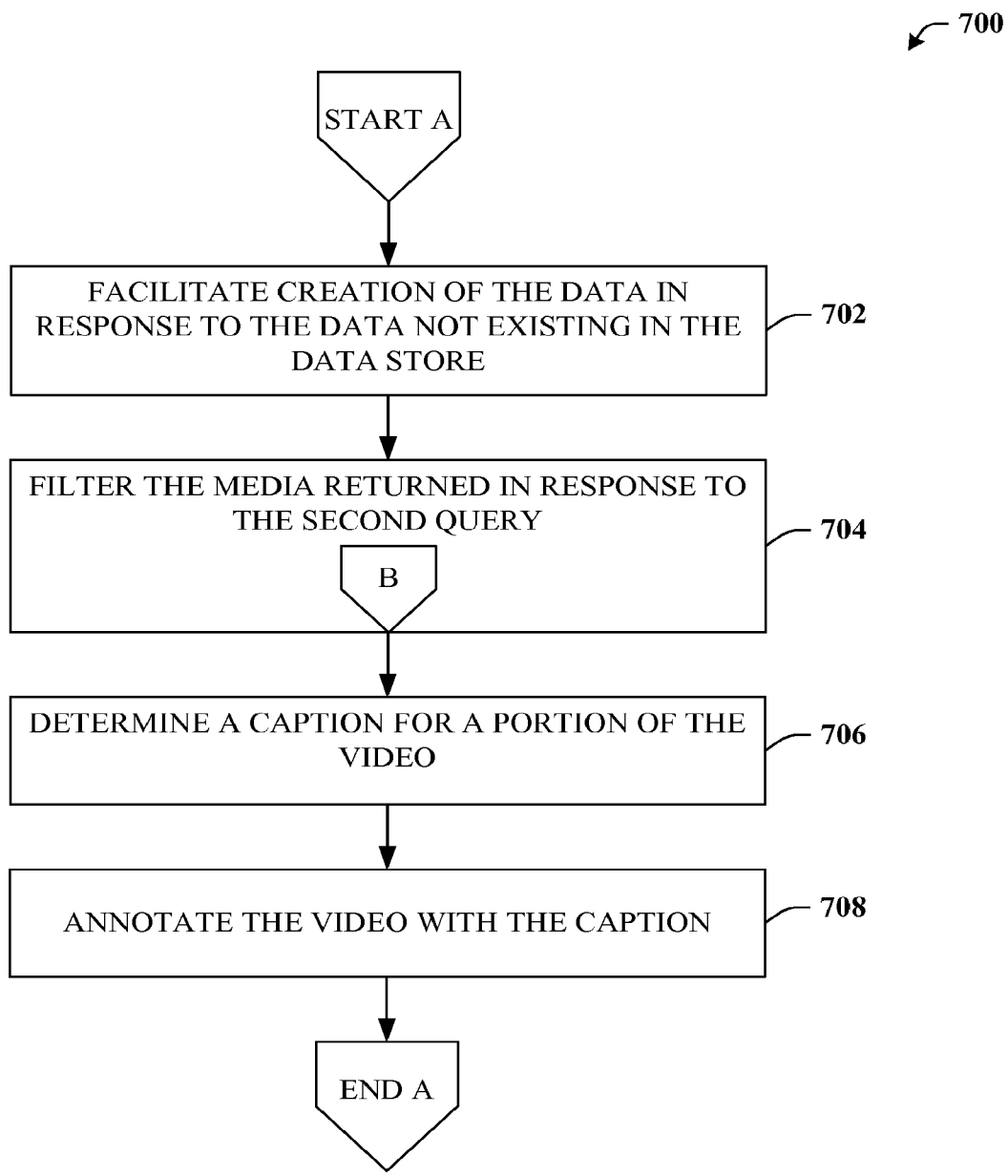
FIG. 7 illustrates an example methodology that can provide for additional features or aspects in connection with automatically composing a video for an audio file in accordance with certain embodiments of this disclosure.
Figure 8:
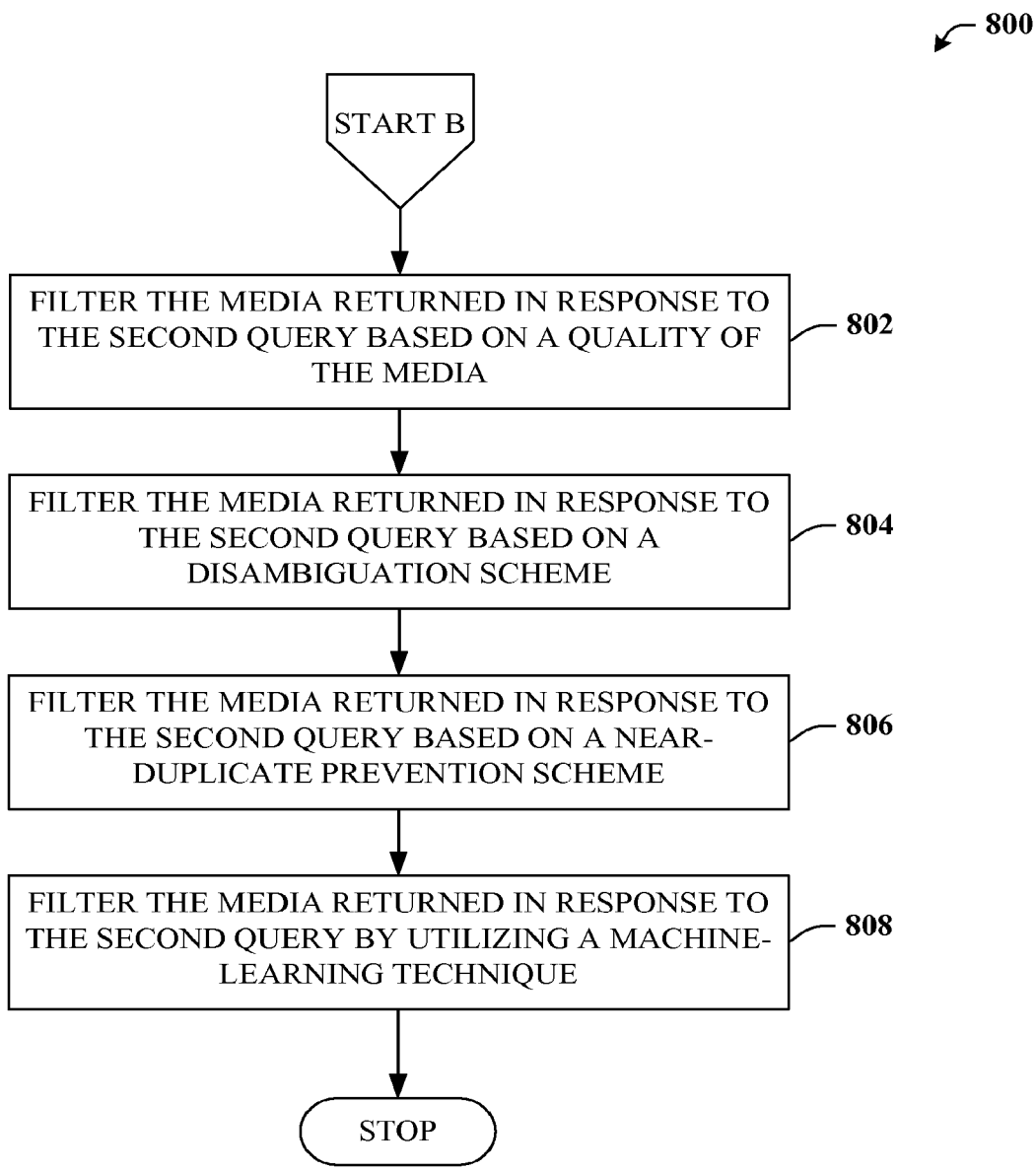
FIG. 8 illustrates an example methodology that can provide for additional aspects or features relating to filtering media returned in response to the second query in accordance with certain embodiments of this disclosure.

FIGS. 6-8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can provide for automatically creating a video for an audio file. For example, at reference numeral 602, metadata associated with an audio file can be mapped (e.g., by a mapping component) to entity data included in a data store. This metadata can be included in the audio file and can be standard metadata such as artist name and track name.

At reference numeral 604, a first query to a knowledgebase can be determined (e.g., by a data mining component) based on the metadata. For example, if the metadata indicates the artist name, one or more knowledgebases can be searched for facts, bios, articles, etc. relating to that artist. At reference numeral 606, results to the first query can be stored to the entity data (e.g., by the data mining component).

At reference numeral 608, a relationship between the audio file and an entry included in the entity data can be determined (e.g., by a ranking component) and at reference numeral 610 this relationship can be analyzed and a relevance score for the relationship can be determined (e.g., by the ranking component). At reference numeral 612, a second query to a media repository can be determined (e.g., by a media mining component) based on the relevance score. For example, entries included in the entity data that are deemed to be of low relevance might not have an associated query to the media repository. On the other hand, entries included in the entity data that have a high relevance score can yield one or more queries to the media repository in order to identify or collect images or video that is pertinent to the audio file.

At reference numeral 614, a video for the audio file can be composed (e.g., by a compilation component) from media returned in response to the second query. Media from the media repository that was returned as a result to the second query (constructed based on a determined relevance) can represent the broad set of media content from which the video can be assembled.

Turning now to FIG. 7, exemplary method 700 is depicted. Method 700 can provide for additional features or aspects in connection with automatically composing a video for an audio file. Method 700 can begin at the start of insert A. At reference numeral 702, creation of the entity data can be facilitated in response to the entity data not existing in the data store. For example, if the mapping detailed in connection with reference numeral 602 of FIG. 6 does not find existing entity data that is suitable, then new entity data can be created.

At reference numeral 704, the media returned in response to the second query (detailed with reference to reference numeral 612) can be filtered. Such filtering can be in accordance with various techniques, which are further detailed in connection with insert B, which is illustrated by FIG. 8.

At reference numeral 706, a caption for a portion of the video can be determined. The caption can relate to a fact or event associated with the audio file or with entity data that is associated with the audio file. At reference numeral 708, the video can be annotated with the caption. Such annotation can include location information for a position of the caption as well as timing information for when, during presentation of the video, the caption should appear and an associated duration. Method 700 ends.

Turning now to FIG. 8, example method 800 is illustrated. Method 800 can provide for additional aspects or features relating to filtering media returned in response to the second query detailed in connection with reference numeral 704. At reference numeral 802, the media returned in response to the second query can be filtered based on a quality of the media. The quality can be determined based upon, e.g., resolution, contrast, saturation, depth-of-field or the like.

At reference numeral 804, the media returned in response to the second query can be filtered based on a disambiguation scheme. For example, media relating to that elements that can be ambiguous (e.g., names) can be effectively distinguished by employing relevant techniques. For instance, an artist can be distinguished from another individual with the same name by facial or celebrity recognition techniques.

At reference numeral 806, the media returned in response to the second query can be filtered based on a near-duplication scheme. For example, media items that are the duplicates, or near-duplicates (e.g., substantially similar) can be filtered to avoid more than one appearing in the video. At reference numeral 808, the media returned in response to the second query can be filtered by utilizing a machine-learning technique, which can be trained or learned based on examination of human-created videos that are popular or otherwise compelling.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
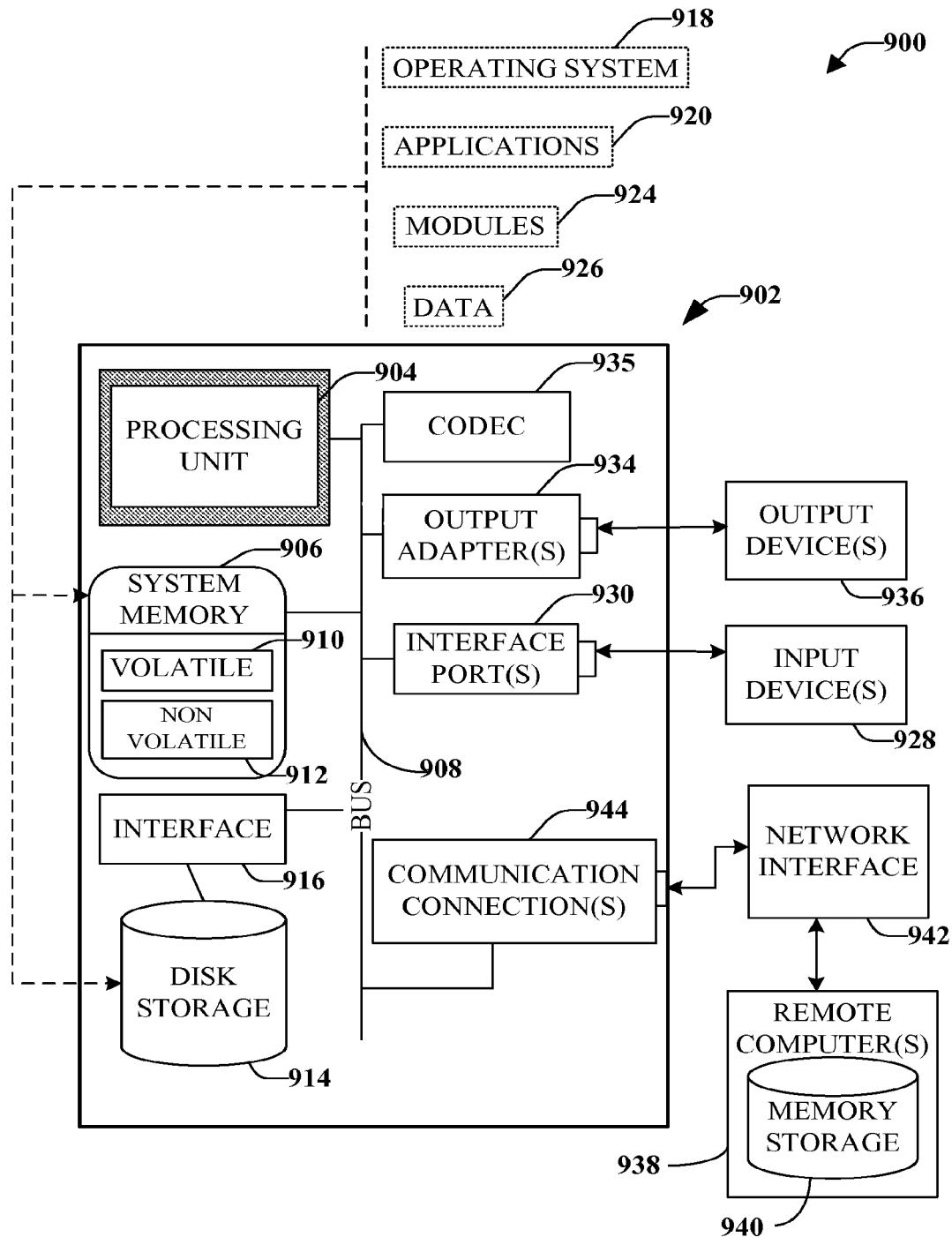
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912 or included in other components detailed herein such as compilation component 126. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/ software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
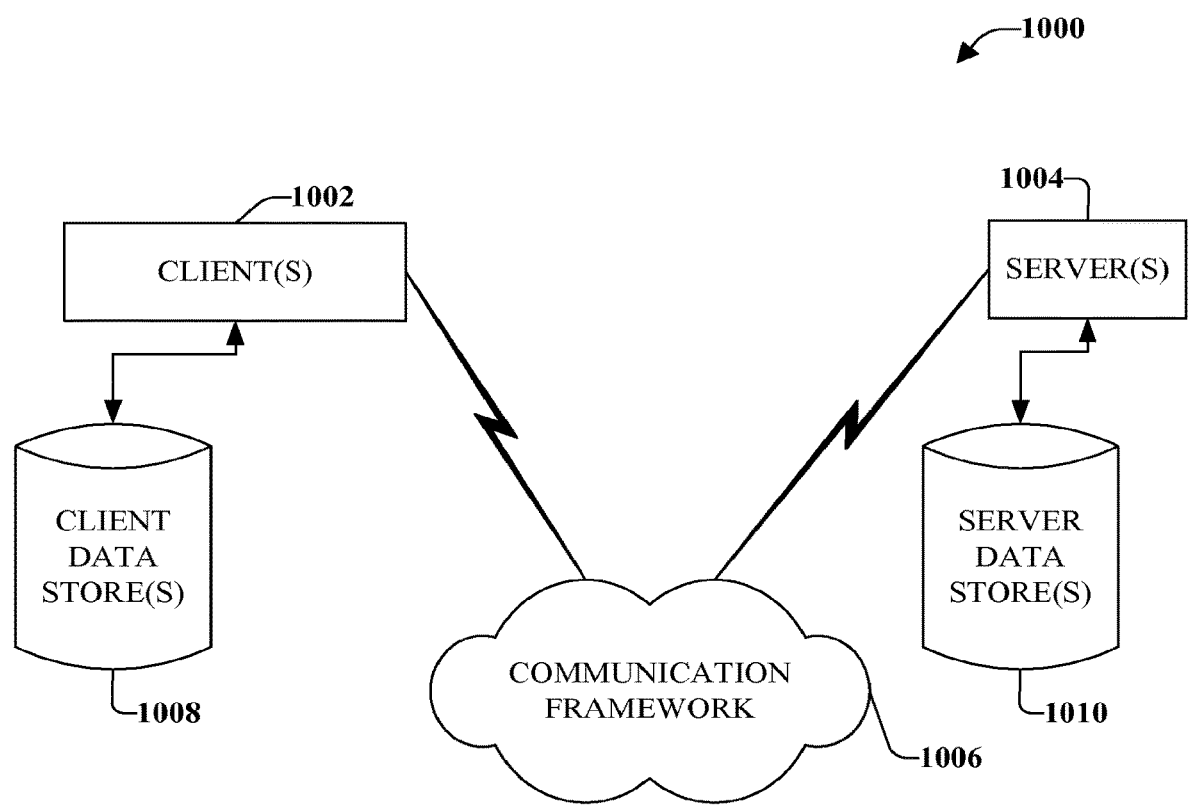
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/ circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system comprising:
   a memory; and
   a processor, coupled to the memory, the processor to:
      determine metadata associated with an audio track;
      identify a plurality of categories that are related to the audio track based on the metadata;
      determine rankings for the plurality of categories that are related to the audio track wherein a category of the plurality of categories comprises information related to an artist corresponding to the audio track and a ranking for the category is indicative of a relevance of the information related to the artist with respect to the audio track;
      perform a query to identify visual media comprising a video for one or more of ranked categories, wherein the visual media is related to the audio track; and
      generate a visual presentation for the audio track by selecting at least some of the visual media comprising the video to include in the visual presentation.

2. The system of claim 1, wherein the visual media comprises of an image.

3. The system of claim 1, wherein the visual media comprises one or more captions that provide textual information related to the audio track.

4. The system of claim 3, wherein one or more of the captions provide a narrative related to the audio track.

5. The system of claim 3, wherein the textual information of the one or more captions comprises information related to an origin of the artist corresponding to the audio track.

6. The system of claim 3, wherein the textual information of the one or more captions comprises information related to an inspiration for music identified by the audio track.

7. The system of claim 1, wherein one or more of the visual media is a user-uploaded media item.

8. The system of claim 1, wherein to generate the visual presentation for the audio track, the processor to:
determine a timing with respect to the audio track for presentation of the selected visual media in an ordered sequence.

9. The system of claim 8, wherein to determine the timing with respect to the audio track for the presentation of the selected visual media in the ordered sequence, the processor to:
   analyze the audio track for at least one of track length, tempo, or beat locations; and
   transition from one of the selected visual media to the next of the selected visual media based on the analysis.

10. The system of claim 1, wherein the categories that are related to the audio track comprise at least one of an award associated with the audio track, biographical information about with the artist corresponding to the audio track, or an inspiration for the audio track.

11. The system of claim 1, wherein the processor is further to filter the visual media based on at least one of a quality of the visual media, a disambiguation associated with the visual media with respect to the media query, or near-duplicate content the visual media.

12. A method comprising:
    determining metadata associated with an audio track;
    identifying a plurality of categories that are related to the audio track based on the metadata;
    determining rankings for the plurality of categories that are related to the audio track, wherein a category of the plurality of categories comprises information related to an artist corresponding to the audio track and a ranking for the category is indicative of a relevance of the information related to the artist with respect to the audio track;
    performing a query to identify visual media comprising a video for one or more of ranked categories, wherein the visual media is related to the audio track; and
    generating, by a processor, a visual presentation for the audio track by selecting at least some of the visual media comprising the video to include in the visual presentation.

13. The method of claim 12, wherein the visual media comprises one or more captions that provide textual information related to the audio track.

14. The method of claim 13, wherein the textual information of the one or more captions comprises information related to an origin of the artist corresponding to the audio track.

15. The method of claim 13, wherein the textual information of the one or more captions comprises information related to an inspiration for music identified by the audio track.

16. The method of claim 12, wherein one or more of the visual media is a user-uploaded media item.

17. The method of claim 12, wherein the categories that are related to the audio track comprise at least one of an award associated with the audio track, biographical information about with the artist corresponding to the audio track, or an inspiration for the audio track.

18. A non-transitory computer-readable storage medium comprising instructions that, responsive to execution by a processor, cause the processor to perform operations comprising:
    determining metadata associated with an audio track;
    identifying a plurality of categories that are related to the audio track based on the metadata;
    determining rankings for the plurality of categories that are related to the audio track, wherein a category of the plurality of categories comprises information related to an artist corresponding to the audio track and a ranking for the category is indicative of a relevance of the information related to the artist with respect to the audio track;

performing a query to identify visual media comprising a video for one or more of ranked categories, wherein the visual media is related to the audio track; and generating, by a processor, a visual presentation for the audio track by comprising the video selecting at least some of the visual media to include in the visual presentation.

19. The non-transitory computer-readable storage medium of claim 18, wherein one or more of the visual media is a user-uploaded media item.

20. The non-transitory computer-readable storage medium of claim 18, wherein the categories that are related to the audio track comprise at least one of an award associated with the audio track, biographical information about with the artist corresponding to the audio track, or an inspiration for the audio track.

* * * * *